Patented Feb. 1, 1938

2,107,245

UNITED STATES PATENT OFFICE 2,107,245

METHOD OF PRODUCING OIL FROM OIL CONTAINING PROTEIN MATERIAL

Lawrence T. Hopkinson, Washington, D. C.

No Drawing. Application February 2, 1937, Serial No. 123,729

11 Claims. (Cl. 87—6)

This invention relates to the production of oil from fat-containing protein material of animal or vegetable origin, and more particularly to the production of oil from fish and the meat of fish and warm blooded animals.

An object of the invention is to provide a complete method for the production of oil from the sources above indicated which may be practiced without impairing the quality of the oil notwithstanding periods of delay between practice of the several steps of the method. Stated in another way, it is an object of the invention to provide a method of producing a high quality oil by a series of steps which need not be practiced in prompt succession to prevent deterioration of the material or impairment of the oil product.

More particularly, an object of the invention is the provision of a method by which the oil produced from a given quality of raw material is superior in point of free fatty acid concentration, color, odor and taste to any oil which could be produced from the same material by any prior art method of which I am aware.

It is well known that when strictly fresh oil-bearing material, such as fish and the meat of fish and warm blooded animals, is rendered, the oil product is very low in free fatty acid, light in color and free of objectionable odor and taste, while if the raw material is allowed to stand for even a short period before rendering, the oil product contains free fatty acid in objectionable proportions and is dark in color and of offensive odor and taste. Free fatty acid in the oil is undesirable, and the value of the oil is to a large extent inversely proportional to the amount of free fatty acid present. The U. S. P. specifications for cod liver oil provide that it shall contain less than 1.4 per cent of free fatty acid. Depth of color is considered by the industry to be generally indicative of high free fatty acid concentrations, and light colored oils bring higher prices than dark oils. Taste and odor are also determining factors in the value of oils whether for pharmaceutical or industrial use. Heretofore, in the production of cod liver oil it has been necessary, in order to obtain an oil product having good color, odor, taste and a low percentage of free fatty acid, to remove the livers from the fish very promptly after the fish are caught and to render the livers within a few hours after removal. This necessity to handle the material promptly and rapidly imposes excessive costs on the industry because it is physically impossible in most cases to transport the fish from the fishing vessel to a rendering plant within the very short permissible space of time, so that, to produce the highest grade oil, the livers must be removed from the fish and rendered on shipboard. Analogous difficulties involving similar high costs are encountered in other rendering industries, including the production of oil from meat and meat scrap collected from various miscellaneous sources.

An important object of the present invention is therefore to provide a method by which fresh, lengthy period until the preliminarily treated promptly upon the fish being caught, or the liver or other part being removed from the fish, or upon the obtaining of the fresh, raw material from any source, so that subsequent operations in the process may be deferred a more or less lengthy period until the preliminarily treated material can be transported to a rendering plant or until labor becomes available to practice the remainder of the process. The process contemplates a single, very simple and readily performed initial step which is to be promptly practiced, and includes subsequent steps which need not be practiced at once but which may be delayed for a very considerable length of time.

Generally speaking, the development of dark color and offensive odor and taste is associated with an increase in the concentration of free fatty acid, and for the purpose of this explanation of the present invention the color, odor and taste factors may be considered as the effects of free fatty acid concentration, since I have found that the remedy which the invention affords unfailingly prevents appreciable increase in the free fatty acids present in the raw material and that in all cases where such prevention is accomplished the oil product is good in point of color, taste and odor. Therefore, the invention may be regarded as primarily contemplating a method of producing oil in which the free fatty acid is present in concentrations which are not appreciably higher than they were in the raw material. It will be understood of course that along with this acid concentration object there is included the object of producing an oil which is not objectionable in point of color, odor and taste.

I believe that the development of free fatty acid in the raw material and in the oil produced from such material is the result of bacterial action enzyme action and chemical action. There appears to be a reaction between the oil and water present in the raw material which seems to be promoted by the closely associated protein or other substance in the material acting as a catalyst. These conclusions are based on the following facts: (1) Free fatty acids are not formed in pure oil freed of water and stored in the absence of air and light; (2) Oil in the presence of distilled water decomposes slowly, probably as the result of chemical change only; and (3) Oil in the presence of water and organic material decomposes rapidly, except when sterilized with heat and sealed in vacuo.

My process contemplates treating fresh, raw material with a germicide and a base. Material so treated may be stored for a very considerable length of time before rendering. When such treated material is rendered the oil product is found to be practically as free of free fatty acid as was the original raw material. The treating substances appear to have the effect of preventing the formation of more than tolerable concentrations of free fatty acid produced by bacterial, enzyme, chemical or other action.

The nature of the separate and conjoint actions of the germicide and base is not fully understood. It is to be assumed of course that the germicide alone would have the effect of inhibiting bacterial action, and it is known that some bases inhibit the action of some of the enzymes found in the raw material. Use of a germicide alone is not effective. I have found that application of formaldehyde, one of the best germicides for the purpose, in the proportions of 2 to 3 per cent by weight to material having a free fatty acid concentration of less than 1 per cent results in holding the development of free fatty acid down to 4 or 5 per cent after a moderate storage period, although there is a further increase on protracted storage. Increasing the ratio of germicide to material produces very little decrease in the proportions of free fatty acid developed. Hence it is thought to be clear that, while the use of a germicide alone constitutes some improvement over no treatment of any kind, in which case concentrations of free fatty acid up to 20 and 30 per cent are developed, the fact that treatment with a germicide alone results in oil having much more than the U. S. P. minimum renders such treatment practically of little value. Similarly, the use of a base alone is incapable of keeping down the development of free fatty acids. Indeed, it is a fact that for certain of the important fat-splitting enzymes the optimum hydrogen ion concentration is on the basic side. Moreover, I have found by tests that the amount of base used up in the material when a germicide is associated with the base is much too small to neutralize the quantities of free fatty acid that would be formed in the material if no base were used. It is a fact therefore that neither a base nor a germicide is effective if either be used alone, but I have found that the combined actions of both a base and a germicide influence the factors which have heretofore operated to produce free fatty acids in some manner so as practically completely to nullify those factors. If free fatty acids are assumed to be formed by chemical, enzyme and bacterial action, it appears that all of these actions are paralyzed in some manner by the conjoint action of the base and germicide proposed by the present invention.

To illustrate a typical embodiment of the process, its application to the production of cod liver oil will be now explained. The livers are removed promptly after the fish are caught and are placed in a container with an aqueous solution of a germicide and a base. The livers are accumulated in the container as they are removed from the freshly caught fish, the germicide and the base being added to the solution as the store of livers increases. It is not uncommon for this accumulation period to extend over two weeks or more, but such periods of storage have been found to have no adverse effect on the livers or on the oil subsequently produced from them, such oil being in all respects comparable to oil produced immediately from perfectly fresh livers. After the accumulation of the desired quantity of livers, the material is taken to port and rendered in any conventional manner. The catches from a large number of fishing vessels may be rendered at a single shore plant. A conventional method of rendering comprises cooking the material and then pressing to extract the oil, the residue (liver press cake) being dried for sale as poultry food or fertilizer. To increase the oil yield it is advantageous to add during the rendering operation a small amount of some acid or a buffer salt. Calcium and magnesium salts, particularly calcium chloride, and mixtures of calcium and ferric or zinc salts, particularly a mixture of calcium chloride and ferric nitrate or chloride, when added to the material during rendering, promote release of oil from the material and thus increase the yield of oil.

I have explained that the fresh material is treated with a base and a germicide. The best bases for the purpose are those having a hydrogen ion concentration of 9 or more. A desirable and acceptable base is sodium carbonate. When stronger bases, such as sodium hydroxide, are used care must be taken to avoid an excess of base because such excess tends to destroy vitamin A and promotes emulsification of the oil and water in the rendering process if the material be heated and violently agitated. When bases having a lower pH than sodium hydroxide are used, the proportion of base to material need not be so accurately measured and the vitamin A potency and the stability of the oil are not affected. The germicide should be a substance capable of inhibiting bacterial action notwithstanding the presence of the base. Manifestly strong acid germicides which depend for their germicidal action on their acidity are not acceptable, because such acidity would be neutralized by the base. The germicide must of course be one which is water soluble. Again, germicides which would form with the base some insoluble reaction product cannot be used. Thus, mercuric chloride and copper sulphate are objectionable. Furthermore, the germicide and the base are preferably such as are not soluble in the oil, although substances which are oil soluble may be used if they can be separated from the oil or if their presence in the oil is not objectionable. Obviously it is distinctly advantageous to use treating substances which do not combine with or dissolve in the oil and are eliminated with the water. Retention of these substances by the press cake is of no serious consequence, inasmuch as the press cake is a by-product of a value which is very small in comparison with the value of the oil. It may be stated in conclusion from the foregoing considerations that any germicide may be used which is either basic, neutral or weakly acid and which is water soluble and remains soluble in the presence of the base which is used. Among the germicides which can be successfully used are formaldehyde, phenol, resorcinol, paranitrophenol, cresol, alcohol, and potassium dichromate.

The optimum ratio of base to germicide to material depends to some extent on the specific base and germicide and on the nature and condition of the material. These proportions can be readily determined in each case by one or two experimental runs. When sodium carbonate and formaldehyde are used, two per cent by weight of each will be found satisfactory for fresh fish livers and most other material. In calculating these percentages, it is understood that sodium carbonate in the usual hydrate form (sal soda, $Na_2CO_3.10H_2O$) is used. The material may be simultaneously treated with both chemicals by spraying on it a water solution of both germicide and base made up at any time in advance. In this connection I have found that when such germicides as formaldehyde are to be used with a strong base such as sodium hydroxide it is best to make up the solution just before it is to be applied to the material because these bases and germicides have a tendency to react with each other and impair the efficiency of the solution. In the case of other bases, such as sodium carbonate, the reaction with formaldehyde and the like is relatively slow, so that such bases and germicides may be mixed and the solution made up well in advance of the time for treatment of the material.

I claim:

1. The method of producing oil from oil-containing protein material which is subject to relatively rapid spoilage, said method comprising treating the material with a substance capable of inhibiting bacterial action notwithstanding the presence of a base and with a substance having a pH concentration of 9 or more, subsequently treating the material with an oil-releasing substance and heating the material to separate the oil from the solids.

2. The method of producing oil from oil-containing protein material which is subject to relatively rapid spoilage, said method comprising treating the material with a substance capable of inhibiting bacterial action notwithstanding the presence of a base and with a substance having a pH concentration of 9 or more, subsequently treating the material with an oil-releasing substance from the group consisting of acids and buffer salts and heating the material to separate the oil from the solids.

3. The method of producing oil from oil-containing protein material which is subject to relatively rapid spoilage, said method comprising charging the material into a vessel containing a water solution comprising a base and a substance from the group consisting of germicides which are basic, neutral or weakly acid and which are soluble in water in the presence of said base, maintaining the material submerged in said solution during a period of time sufficient to cause spoilage of said material in the absence of any treatment, the amount of base consumed by the oil of said material during said period being insufficient to neutralize the free fatty acid which would develop during a like period in the oil of material treated with said germicide only, and thereafter processing the material to separate from the solids, water, base and germicide a quantity of oil of relatively low free fatty acid concentration.

4. The method of producing oil from oil-containing protein material which is subject to relatively rapid spoilage, said method comprising inhibiting the development of free fatty acids and objectionable odor, taste and color characteristics by submerging fresh material of low free fatty acid concentration and devoid of objectionable odor, taste and color characteristics in a solution comprising a base and a substance capable of inhibiting bacterial action in the material notwithstanding the presence of said base, maintaining the material so submerged during a period of time sufficient to cause spoilage of said material in the absence of any treatment, the concentration of the base and the bacterial inhibitor taken together being sufficient to render the material unfit for use as food and the amount of base consumed by the oil during storage of the material being insufficient to neutralize the free fatty acid which would develop during a like period in the oil of material treated with said bacterial action inhibiting substance only, and thereafter processing the material to separate from the solids, water, base and bacterial action inhibitor a quantity of oil of relatively low free fatty acid concentration.

5. The method of producing oil from oil-containing fish material which comprises inhibiting the development of free fatty acids and objectionable odor, taste and color characteristics by submerging freshly caught material of low free fatty acid concentration and devoid of objectionable odor, taste and color characteristics in a solution comprising a base and a substance capable of inhibiting bacterial action in the material notwithstanding the presence of said base, maintaining the material so submerged during a period of time sufficient to cause spoilage of said material in the absence of any treatment, the concentration of the base and the bacterial inhibitor taken together being sufficient to render the material unfit for use as food and the amount of base consumed by the oil during storage of the material being insufficient to neutralize the free fatty acid which would develop during a like period in the oil of material treated with said bacterial action inhibiting substance only, and thereafter processing the material to separate from the solids, water, base and bacterial action inhibitor a quantity of oil of relatively low free fatty acid concentration.

6. The method of producing oil from oil-containing protein material which is subject to relatively rapid spoilage, said method comprising inhibiting the development of free fatty acids and objectionable odor, taste and color characteristics by submerging fresh material of low free fatty acid concentration and devoid of objectionable odor, taste and color characteristics in a solution comprising sodium carbonate and a substance capable of inhibiting bacterial action in the material notwithstanding the presence of said sodium carbonate, maintaining the material so submerged during a period of time sufficient to cause spoilage of said material in the absence of any treatment, the concentration of the sodium carbonate and the bacterial inhibitor taken together being sufficient to render the material unfit for use as food and the amount of sodium carbonate consumed by the oil during storage of the material being insufficient to neutralize the free fatty acid which would develop during a like period in the oil of material treated with said bacterial action inhibiting substances only, and thereafter processing the material to separate from the solids, water, sodium carbonate and bacterial action inhibitor a quantity of oil of relatively low free fatty acid concentration.

7. The method of producing oil from oil-containing protein material which is subject to relatively rapid spoilage, said method comprising inhibiting the development of free fatty acids and objectionable odor, taste and color characteristics by submerging fresh material of low free fatty acid concentration and devoid of objectionable odor, taste and color characteristics in a solution comprising a base and a germicide from the group consisting of formaldehyde, phenol, resorcinol, paranitrophenol, cresol, alcohol, and potassium dichromate, maintaining the material so submerged during a period of time sufficient to cause spoilage of said material in the absence of any treatment, the concentration of the base and the germicide taken together being sufficient to render the material unfit for use as food and the amount of base consumed by the oil during storage of the material being insufficient to neutralize the free fatty acid which would develop during a like period in the oil of material treated with said germicide only, and thereafter processing the material to separate from the solids, water, base and germicide a quantity of oil of relatively low free fatty acid concentration.

8. The method of producing oil from oil-containing protein material which is subject to relatively rapid spoilage, said method comprising inhibiting the development of free fatty acids and objectionable odor, taste and color characteristics by submerging fresh material of low free fatty acid concentration and devoid of objectionable odor, taste and color characteristics in a solution comprising a base having a pH of 9 or more and a substance capable of inhibiting bacterial action in the material notwithstanding the presence of said base, maintaining the material so submerged during a period of time sufficient to cause spoilage of said material in the absence of any treatment, the concentration of the base and the bacterial inhibitor taken together being sufficient to render the material unfit for use as food and the amount of base consumed by the oil during storage of the material being insufficient to neutralize the free fatty acid which would develop during a like period in the oil of material treated with said bacterial action inhibiting substance only, and thereafter processing the material to separate from the solids, water, base and bacterial action inhibitor a quantity of oil of relatively low free fatty acid concentration.

9. In the method of producing oil from oil-containing protein material which is subject to relatively rapid spoilage and which has been submerged in a water solution comprising a base and a substance capable of inhibiting bacterial action in the material notwithstanding the presence of said base during a period of time sufficient to cause spoilage of said material in the absence of any treatment, the concentration of the base and the bacterial inhibitor taken together being sufficient to render the material unfit for use as food and the amount of base consumed by the oil during said period being insufficient to neutralize the free fatty acid which would develop during a like period in the oil of material treated with said bacterial action inhibiting substance only, the step of processing the material to separate from the solids, water, base and bacterial action inhibitor a quantity of oil of relatively low free fatty acid concentration.

10. In the method of producing oil from oil-containing fish entrail material which is subject to relatively rapid spoilage and which has been submerged in a water solution of sodium carbonate and a substance capable of inhibiting bacterial action in the material notwithstanding the presence of said sodium carbonate during a period of time sufficient to cause spoilage of said material in the absence of any treatment, the concentration of the sodium carbonate and the bacterial inhibitor taken together being sufficient to render the material unfit for use as food and the amount of sodium carbonate consumed by the oil during said period being insufficient to neutralize the free fatty acid which would develop during a like period in the oil of material treated with said bacterial action inhibiting substance only, the step of processing the material to separate from the solids, water, sodium carbonate and bacterial action inhibitor a quantity of oil of relatively low free fatty acid concentration.

11. In the method of producing oil from oil-containing fish entrail material which is subject to relatively rapid spoilage and which has been submerged in a water solution of sodium carbonate and formaldehyde in the original proportions of substantially two per cent by weight of each in relation to the weight of the material during a period of time sufficient to cause spoilage of said material in the absence of any treatment, which concentration is sufficient to render the material unfit for use as food and the amount of sodium carbonate consumed by the oil during said period being insufficient to neutralize the free fatty acid which would develop during a like period in the oil of material treated with said formaldehyde only, the step of processing the material to separate from the solids, water, sodium carbonate and formaldehyde a quantity of oil of relatively low free fatty acid concentration.

LAWRENCE T. HOPKINSON.

CERTIFICATE OF CORRECTION.

Patent No. 2,107,245. February 1, 1938.

LAWRENCE T. HOPKINSON.

It is hereby certified that error appears in the printed specification of the above numbered patent requiring correction as follows: Page 1, second column, line 11, strike out the words "lengthy period until the" and insert instead raw material may be; line 51, after the syllable "tion" insert a comma; page 3, second column, line 68, claim 6, for "substances" read substance; and that the said Letters Patent should be read with these corrections therein that the same may conform to the record of the case in the Patent Office.

Signed and sealed this 15th day of March, A. D. 1938.

(Seal)

Henry Van Arsdale,
Acting Commissioner of Patents.